F. M. CLERC.
METALLURGY OF ZINC.
APPLICATION FILED NOV. 4, 1911.

1,012,816.

Patented Dec. 26, 1911.

2 SHEETS—SHEET 1.

WITNESSES:

INVENTOR:
Frank L. Clerc,
BY
ATTORNEYS

F. M. CLERC.
METALLURGY OF ZINC.
APPLICATION FILED NOV. 4, 1911.

1,012,816.

Patented Dec. 26, 1911.
2 SHEETS—SHEET 2.

UNITED STATES PATENT OFFICE.

FRANK LAURENT CLERC, OF BOULDER, COLORADO.

METALLURGY OF ZINC.

1,012,816.  Specification of Letters Patent.  Patented Dec. 26, 1911.

Application filed November 4, 1911. Serial No. 658,535.

*To all whom it may concern:*

Be it known that I, FRANK LAURENT CLERC, a citizen of the United States, residing in Boulder, county of Boulder, State of Colorado, have invented certain new and useful Improvements in Metallurgy of Zinc; and I do hereby declare the following to be a full, clear, and exact description of the invention, such as will enable others skilled in the art to which it appertains to make and use the same.

In Letters Patent of the United States granted to me under date of August 29, 1911, No. 1,002,037, for improvements in the metallurgy of zinc, I have described the reduction of zinc oxid by carbon and the distillation of the metal preliminary to its ultimate recovery as spelter, by a method whose fundamental or characteristic feature consists in establishing a trapped body of molten metal in the bottom of a retort, said trapped body of metal terminating outside of the retort in an outer well, supplying a charge of zinc oxid and carbon to the surface of the trapped portion within the retort, heating the metal in the outer well, and reducing the zinc oxid of the charge by the carbon by means of heat conducted from the well through said molten metal to the surface of the portion trapped within the retort.

My present invention constitutes an amplification of the procedure set forth in my patent referred to, for the purpose of adapting it more fully to varying conditions of practice, and particularly to make it easier to operate, to economize heat, and to facilitate renewals and repairs.

Generally expressed, the present improvement consists in grouping a plurality of retorts (two or more) about an outer well which they have in common and from which heat is conducted to the trapped portions of molten metal, the metal of the outer well being subdivided to correspond to the several groups of retorts but being located in a continuous heating chamber, so that a group of individual retorts may be tapped or drawn as desired together with the portion of molten metal coöperating therewith, without interrupting the heating operation as a whole and without interfering with the orderly and regular progress of the reducing and distilling operations in the remaining retorts.

Figure 1:
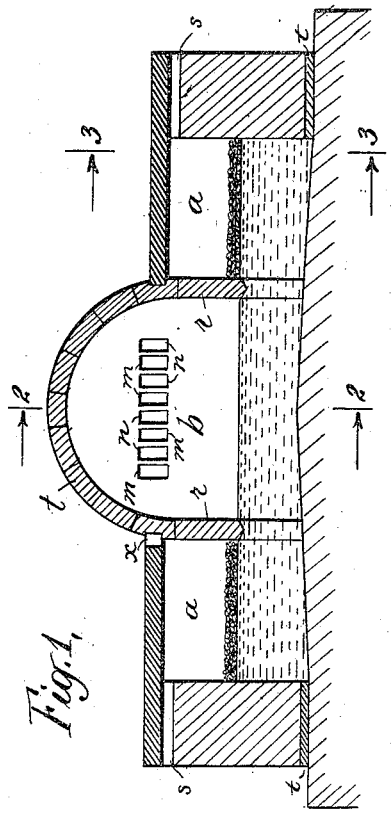
Figure 2:
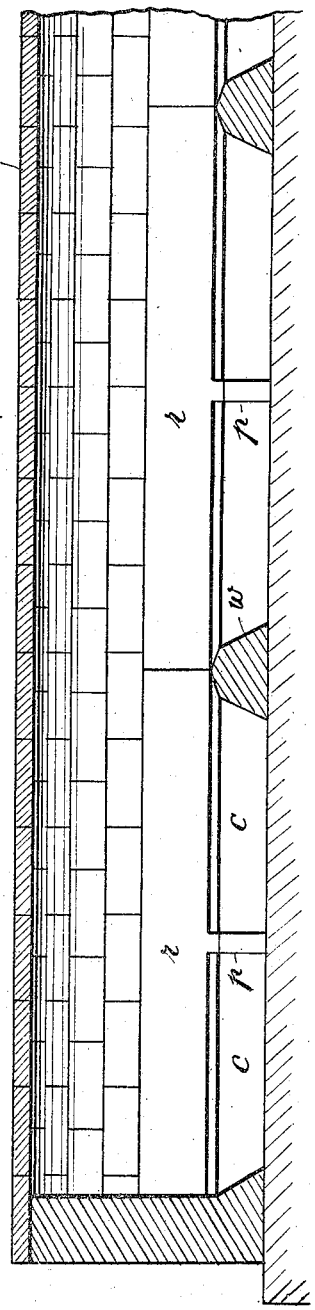
Figure 3:
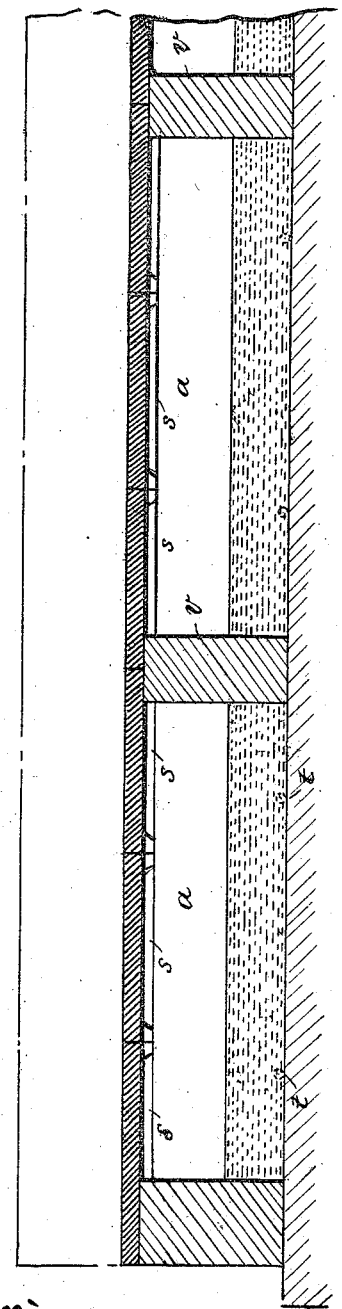
Figure 4:
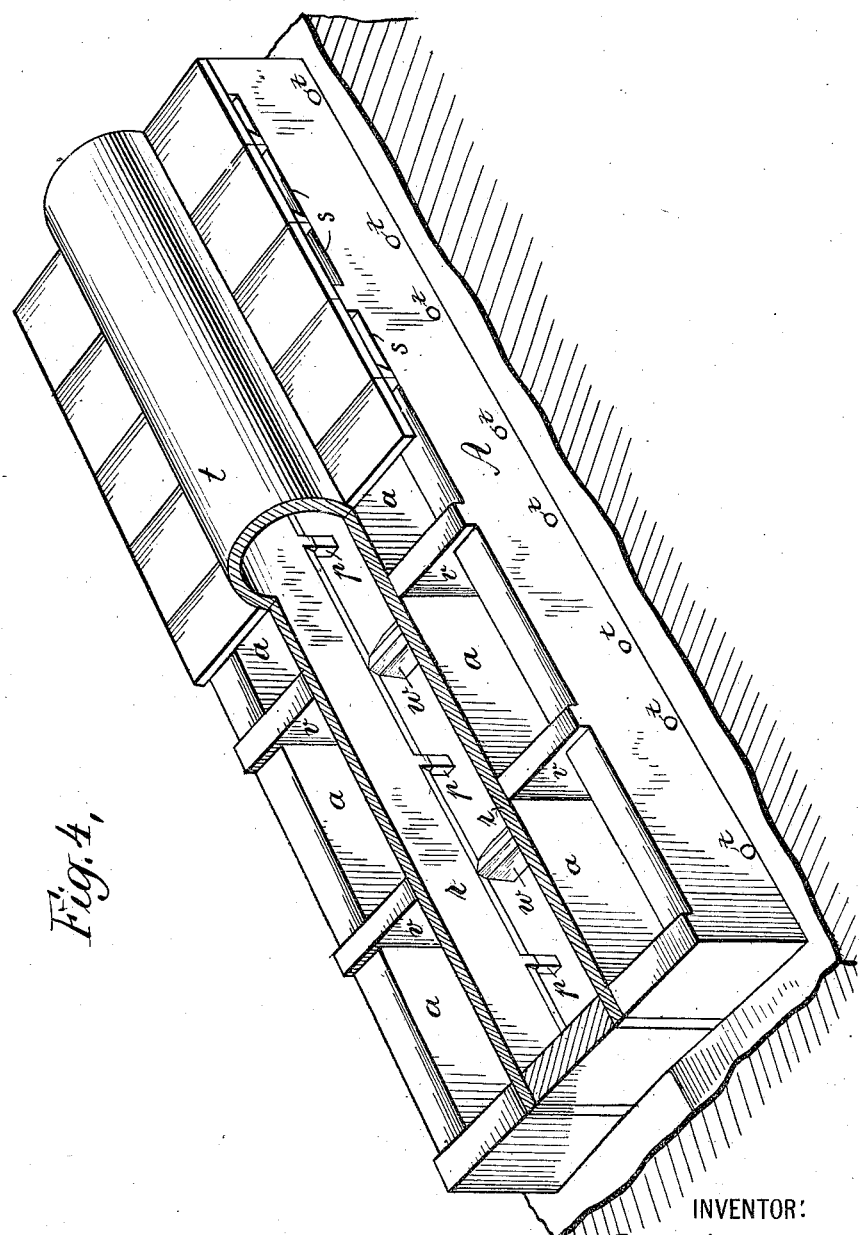

In the accompanying drawings, Figure 1 represents a cross-sectional view of a suitable form of apparatus appropriate to and embodying my improvements; Fig. 2 represents a longitudinal sectional view on a plane indicated by the line 2—2 of Fig. 1; Fig. 3 represents a longitudinal sectional view on a plane indicated by the line 3—3 of Fig. 1; and Fig. 4 represents an axiometric projection of the structure, with certain portions of the outer walls removed, to permit the interior to be shown to advantage.

Similar letters of reference indicate similar parts throughout the several views.

Referring to the drawings, A indicates the main furnace structure, and $a$ the several retorts which communicate with an outer well common to them all located in the heating chamber $b$. The retorts communicate at bottom with the outer well and chamber $b$ by means of apertures $c$ below the longitudinal rear walls $r$ of the retorts, these walls being supported in any suitable manner, as, for instance, by the thin fire-brick or like pillars $p$.

The heating chamber is preferably heated by gases in combustion, as in my former patent, and these gases pass over the surface of the quiescent body of metal in the outer well, raising it to so high a temperature that the necessary heat for reducing the zinc oxid by the carbon of the charges in the several retorts and distilling off the zinc is efficiently attained. The walls $r$ likewise constitute, in the form shown in the drawing, the side walls of the heating chamber and trap the molten metal within the retorts, as shown. The said walls are connected by the arch $t$, and the several retorts are separated from each other by the party walls $v$. It will thus be noted that transversely of the furnace structure as shown the retorts are arranged in groups and that longitudinally of the furnace structure these groups are arranged in series, and furthermore that in both of these relationships they are served by a heating chamber common to them all and common to the metal in the exterior well. A further characteristic feature of the construction is that the heating chamber is provided with a series of cross walls $w$ which attain a level somewhat higher than the lower edges of the longitudinal walls $r$ and which are submerged in the metal of the exterior well. By this arrangement of the retorts in groups the radiation of heat from the outer walls of the retorts is diminished, and a larger proportion of the heat communicated to the metal in the outer well is conducted into the retorts. So also, by the connection of the groups in series, each group is isolated from the other groups, so that the molten metal in its retorts and outer well can be drawn off without affecting the level of the metal in the retorts and wells of the other groups or interfering with their proper working. The trapped body of molten metal in any group of retorts and wells can then be renewed without cooling down or emptying the other groups.

Having thus described my invention what I claim is:

1. Apparatus for reducing zinc oxid by carbon, comprising a plurality of retorts closed at bottom by a trapped body of substantially quiescent molten metal terminating in a well exterior to the retorts, a continuous heating chamber inclosing the common well, and means for directing fuel in combustion across the upper surface of the metal in the well; substantially as described.

2. Apparatus for reducing zinc oxid by carbon, comprising a plurality of retorts closed at bottom by a trapped body of substantially quiescent molten metal terminating in a well exterior to the retorts and about which they are grouped, a continuous heating chamber inclosing the common well, and means for directing fuel in combustion across the upper surface of the metal in the well; substantially as described.

3. Apparatus for reducing zinc oxid by carbon, comprising a plurality of groups of retorts closed at bottom by a trapped body of substantially quiescent molten metal terminating in a well exterior to the groups, partitions submerged in the well and subdividing it into constituent units corresponding to the several groups, a continuous heating chamber inclosing the common well, and means for directing fuel in combustion across the upper surface of the metal in the well; substantially as described.

4. Apparatus for reducing zinc oxid by carbon, comprising a plurality of groups of retorts closed at bottom by a trapped body of substantially quiescent molten metal terminating in a well exterior to the retorts and located intermediate of the members of each group, a continuous heating chamber inclosing the common well and means for directing fuel in combustion across the upper surface of the metal in the well; substantially as described.

In testimony whereof I affix my signature, in presence of two witnesses.

FRANK LAURENT CLERC.

Witnesses:
   JOHN C. PENNIE,
   MINERVA LOBEL.

---

Copies of this patent may be obtained for five cents each, by addressing the "Commissioner of Patents, Washington, D. C."